United States Patent [19]

Memon

[11] Patent Number: 5,704,971
[45] Date of Patent: Jan. 6, 1998

[54] HOMOGENEOUS CRUMB RUBBER MODIFIED ASPHALT

[76] Inventor: Mohammed Memon, 46525 Hollymead Pl., Sterling, Va. 20165

[21] Appl. No.: 810,046

[22] Filed: Mar. 4, 1997

[51] Int. Cl.$^6$ ............................................. C09D 195/00
[52] U.S. Cl. ........................... 106/281.1; 524/59; 524/64
[58] Field of Search .................. 106/281.1, 273.1; 524/59, 64

[56] References Cited

U.S. PATENT DOCUMENTS

| | | | |
|---|---|---|---|
| 4,166,049 | 8/1979 | Huff | 521/44.5 |
| 4,840,316 | 6/1989 | Barclay | 241/279 |
| 5,109,041 | 4/1992 | Matsuno et al. | 106/281.1 |
| 5,304,576 | 4/1994 | Martinez | 521/41 |
| 5,334,641 | 8/1994 | Rouse | 524/71 |
| 5,391,226 | 2/1995 | Frankowski | 106/696 |
| 5,405,440 | 4/1995 | Green et al. | 106/281.1 |
| 5,436,285 | 7/1995 | Causyn et al. | 524/68 |
| 5,437,717 | 8/1995 | Doyle et al. | 106/284.4 |
| 5,460,649 | 10/1995 | Strassman | 106/282 |
| 5,470,384 | 11/1995 | Cha et al. | 106/273.1 |
| 5,476,542 | 12/1995 | Doyle et al. | 106/219 |
| 5,492,561 | 2/1996 | Flanigan | 106/273.1 |
| 5,501,730 | 3/1996 | Duong et al. | 106/281.1 |
| 5,558,704 | 9/1996 | Masuda et al. | 106/281.1 |
| 5,604,277 | 2/1997 | Osborn | 524/270 |

FOREIGN PATENT DOCUMENTS

| 2462459 | 3/1981 | France | 106/281.1 |
|---|---|---|---|

*Primary Examiner*—Anthony J. Green
*Attorney, Agent, or Firm*—Laubscher & Laubscher

[57] ABSTRACT

An improved asphalt composition for pavement and a method for producing the same is characterized by mixing peroxide with crumb rubber to modify the crumb rubber so that mixes more evenly with the asphalt when added thereto. A compatibilizer/polymer is also added to the asphalt. The resulting composition is homogeneous and demonstrates improved settling and rheological properties at high and low temperatures.

13 Claims, 2 Drawing Sheets

HOMOGENEOUS CRUMB RUBBER MODIFIED ASPHALT

BACKGROUND OF THE INVENTION

Asphalt is a viscoelastic material with desirable mechanical/rheological properties. In order to improve these mechanical/rheological properties, different materials have been added to the asphalt. One such material is crumb rubber. However, such a modified asphalt has certain drawbacks ranging from settling of rubber particles within the asphalt during storage and application to raveling of the pavement formed using the modified product.

One of the most important characteristics of a crumb rubber and asphalt mixture is the settling of the modified binder. The present invention relates to the use of peroxide to modify the bond between the crumb rubber and the asphalt. The addition of a compatibilizer/polymer further enhances the product by providing improved rheological properties for both high and low temperatures.

BRIEF DESCRIPTION OF THE PRIOR ART

It is known in the art to combine crumb rubber with asphalt to provide a product with improved rheological properties. The degree of improvement is a function of the crumb rubber particle size, the manner in which crumb rubber devulcanizes, the chemical/physical properties of the asphalt as well as the asphalt source. However, modifying asphalt with crumb rubber often produces a non-homogeneous product that does not pass the guidelines set forth by the AASHTO Provisional Standards TP5-93, "Practice of the laboratory Evaluation of Modified Asphalt Systems." Furthermore, in some cases the addition of crumb rubber degrades the rheological properties of the crumb rubber modified asphalt. For crumb rubber to be acceptable and in compliance with the Inter Model Surface Transportation Act (ISTEA) of 1992 which mandates the use of crumb rubber in asphalt pavement construction, the deficiencies associated with modifying asphalt with crumb rubber must be overcome. These deficiencies include separation in the modified binder, homogeneity of the modified binder, an improper polymeric matrix, and raveling of the pavement produced using the modified binder.

The present invention was developed in order to overcome these and other drawbacks of the prior crumb rubber asphalts by providing modified crumb rubber for mixing with the asphalt and a compatibilizer, thereby resulting in a homogeneous mixture with improved settling characteristics.

SUMMARY OF THE INVENTION

Accordingly, it is a primary object of the invention to provide a method for producing crumb rubber modified asphalt wherein a quantity of crumb rubber is heated to a first temperature in the range of 65°–85° C. and peroxide is mixed therewith for about 30 minutes. The crumb rubber with peroxide is added to compatibilized asphalt binder, following which a compatibilizer is added to the mixture. The asphalt is continuously stirred while maintaining the asphalt at a second temperature in the range of 160°–170° C. so that the crumb rubber is evenly disbursed throughout the asphalt.

According to another object of the invention, the peroxide is mixed with the crumb rubber while the rubber is continuously being stirred for a period of between 20 and 30 minutes. Moreover, the asphalt is maintained within the second temperature range for a period of between 25 and 35 minutes while the compatibilizer is added. After addition of the compatibilizer, the asphalt is maintained within the second temperature range for a period for 1–2 hours and then allowed to cool to ambient temperature.

In its preferred form, the asphalt composition is approximately 84.28–94.42% asphalt, 12.64–4.68% crumb rubber, 2.45–1.36% peroxide, and 0.63–0.53% compatibilizer. The peroxide preferably has a concentration of 0.02–0.06 millimoles/gram weight of the asphalt binder and the compatibilizer has a concentration of 0.015–0.045 millimoles/gram weight of the asphalt binder.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
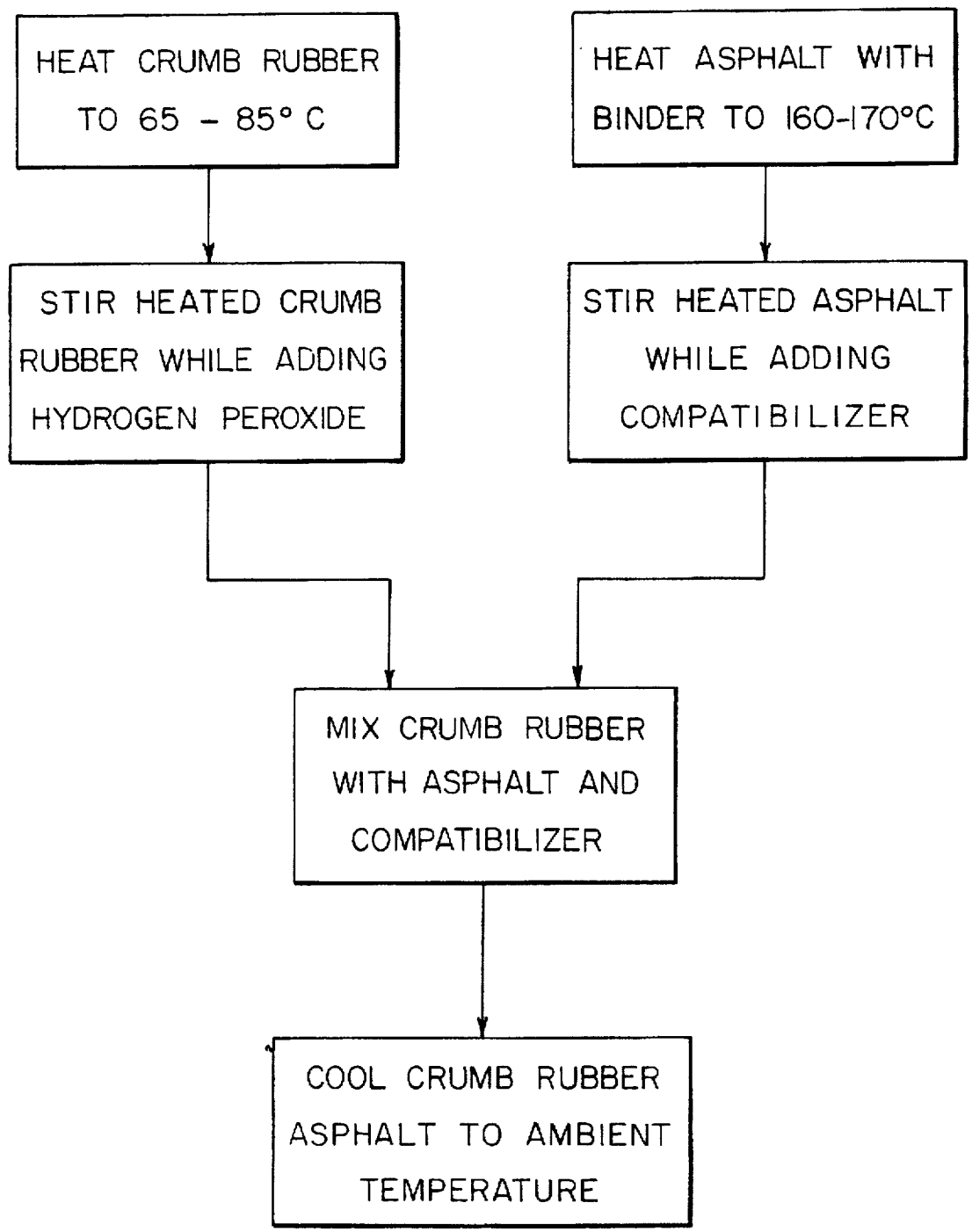
FIG. 1 is a block diagram showing the steps for manufacturing the crumb rubber modified asphalt according to the invention.

Referring first to FIG. 1, the preferred method for producing crumb rubber modified asphalt with binder will be described. Crumb rubber is first heated to between 65° and 75° C. and mixed with peroxide, and preferably hydrogen peroxide having a concentration of 0.02–0.06 millimoles/gram weight of the asphalt binder, for between 20 and 30 minutes in a continuous stirring mode. The peroxide chemically modifies the crumb rubber by generating a carbonium ion on the crumb rubber. More particularly, the peroxide converts the carbonium site of crumb rubber to carboxylic sites that are more easily reactive to asphalt as will be developed below. Similarly, a quantity of asphalt containing a binder is heated to a temperature of 160°–170° C. to which a compatibilizer is added also in a continuous stirring mode for a period of between 25 and 35 minutes. The crumb rubber is then mixed with the asphalt by sprinkling the chemically modified crumb rubber particles onto the compatiblized asphalt surface while continuously stirring the same. The resulting mixture is then maintained at the higher temperature for between 1 and 2 hours following which the mixture is allowed to cool to the ambient temperature.

Figure 2:
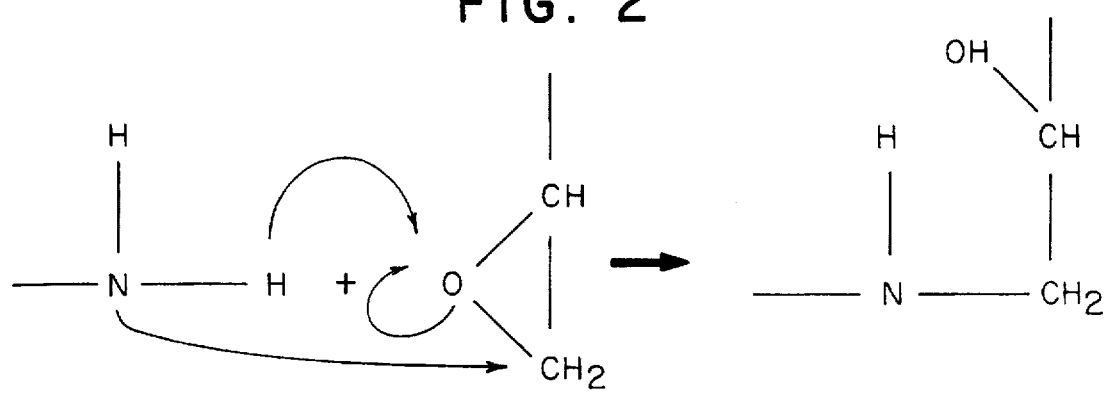
FIGS. 2, 3 and 4 are diagrams representing the chemical reactions, respectively, occurring during the manufacturing process represented in FIG. 1.
Figure 3:
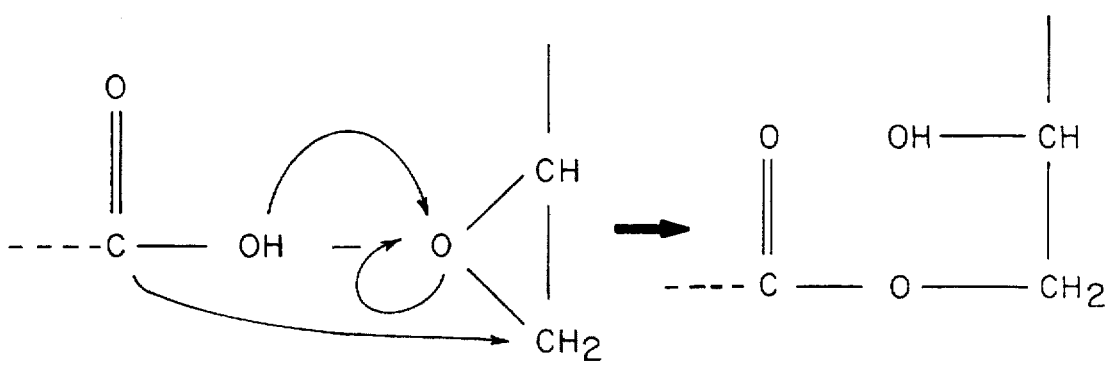
Figure 4:
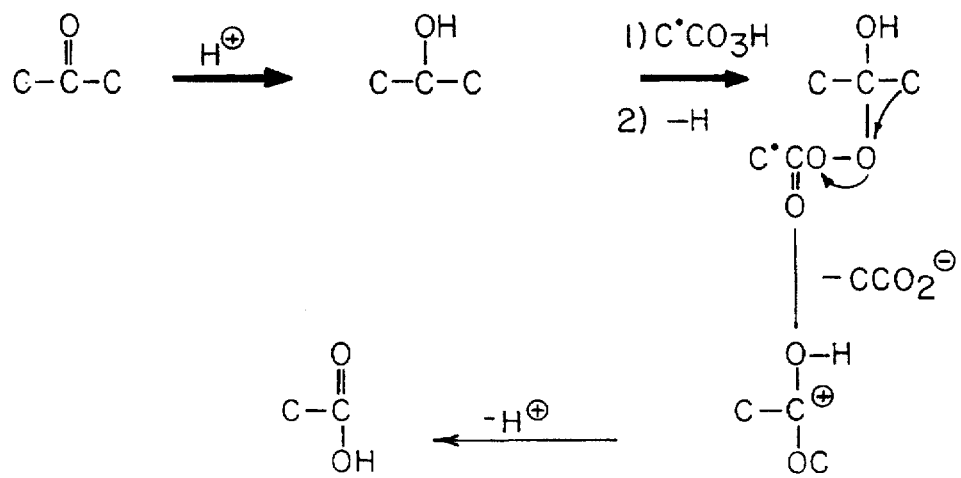

Part of the compatibilizer interacts with the asphalt and any excess interacts with the crumb rubber. Thus, the compatibilizer acts as a bridge between the asphalt and the crumb rubber as shown in FIGS. 2 and 3. In lieu of adding the compatibilizer directly to the asphalt, the same results are achieved if the compatibilizer is added to the modified crumb rubber prior to mixing with the asphalt. The compatibilizer is preferably a polymer having a concentration of 0.015–0.045 millimoles/gram weight of the asphalt binder such as methacrylate with glycidyl containing monomer, ethylene based glycidyl containing monomer, or a terpolymer of ethylene, butyl acrylate or glycidal methacrylate.

One major benefit of the addition of the peroxide is that it makes the dispersion of the crumb rubber into the asphalt much easier. Without this modification and mixing process, the crumb rubber forms large clumps and takes longer to mix into the asphalt. Moreover, the modified asphalt is much smoother than conventional crumb rubber asphalt mixtures because of the even dispersion of the crumb rubber within the asphalt.

The crumb rubber modified asphalt according to the invention comprises the following weight by volume percentages of its constituents:

| | |
|---|---|
| asphalt | 84.28–93.42% |
| crumb rubber | 12.64–4.68% |
| hydrogen peroxide | 2.45–1.36% |
| compatibilizer | 0.63–0.53% |

The proper chemical bonding between the crumb rubber constituents and the asphalt in combination with the compatibilizer produces a product that demonstrates improved rheological properties at both low and high temperatures as compared to those of the prior asphalt compounds. The homogeneity, dispersion, settling and improved rheological properties can be achieved with different asphaltic binders. The carbonium ion generation and production of the carboxylic site-generated crumb rubber in combination with the compatibilizer in a monomeric or polymeric form can be easily processed at the crumb rubber manufacturing site and then transported to the hot asphalt binder plant for further use. The process consumes part of the carbon black and leaves the remaining carbon black for reinforcement. Accordingly, crumb rubber will be more widely accepted as an asphalt additive.

Several asphalt compositions may be used as components in the present invention. They include the SHRP asphalts AAB-1, AAG-1, and AAM-1. These asphalts include several compositional ranges which emphasize oxygen concentration, nitrogen concentration, carboxylic acid concentration, amine concentration, asphaltene level, polar aromatics concentration and the like.

Since the carboniuim ions and enhanced carboxylic sites generated by peroxide—through conversion of the oxygenated sites available on carbon black—are expected to react with the functional groups available in asphalt, the fact that carboxylic groups can react with the other functional groups available in the asphalt material can enhance the homogeneity of the product, whereas the proper polymeric matrix can enhance the separation in the modified binder. Crumb rubber makes the use of this type of material particularly suitable for improving the low and high temperatures of this modified asphalt binder, especially with different ranges of asphalt compositions.

Sample compositions of asphalt modified with crumb rubber according to the invention have been assessed by measuring the various moduli, -S (creep stiffness), -m (rate of change of stiffness), and computed values according to the requirements of the Supper-pave binder specification as well as the PG grade of the crumb rubber modified asphalts prepared with and without free radical generators followed by the addition of compatibilizer. In each case, controls were prepared under the same conditions but without the use of the peroxide and polymer for comparison purposes.

EXAMPLE 1

Asphalt AAB-1

This asphalt showed improvement in the PG grade from 66-24 to 74-37 with separation of 5–7%. This indicates that the modified asphalt performs better at the higher and lower application temperatures and thus should avoid both high temperature rutting and low temperature cracking which are serious limitations in the field. Optimized performance in this case was achieved with 0.040 and 0.03 millimoles/gram peroxide and compatibilizer, respectively. Crumb rubber was used at 15%. Improvement in this asphalt was easy to accomplish due to the presence of a sufficient number of functional groups of the right type that can react with the enhanced carboxylic sites on the crumb rubber generated by the peroxide with the proper polymeric matrix with compatibilizer. The resulting modified product was smooth and easy to handle. The crumb rubber was finely dispersed in the asphalt matrix and no clumping or lumping occurred. Microscopic examination of the control revealed sumps but none in the modified bonder.

EXAMPLE 2

Asphalt AAG-1

This asphalt showed improvement in the PG grade from 66-24 to 74-26. In this case, improvement was seen in the high temperature stiffness of the asphalt binder. There was not significant change in the low temperature stiffness in this composition. The improvement depends on the asphalt internal assemblage and on the functional groups present in the asphalt. This improvement was accomplished with only 0.025 and 0.02 millimoles/gram peroxide and compatibilizer concentration, respectively. Dispersion of rubber particles is apparent in the modified product since there was no clumping or lumping and the reparation results were in the range of 5 to 7%.

EXAMPLE 3

Asphalt AAM-1

This asphalt showed improvement using 0.035 and 0.03 millimoles/gram of peroxide and compatibilizer. In this example, improvement in the stiffness was possible at a higher peroxide concentration due to the solvent de-asphalting process used to manufacture this asphalt and to the low concentration of carboxylic and other reactive groups in the asphalt. The dispersion was smooth and superior to the control. The improvement was observed in the form of PG grade from 68-30 to 74-33 with separation results of 5 to 7%.

The production of crumb rubber carbonium ions and enhanced carboxylic site generation in combination with a proper compatibilizer polymeric matrix are the characterizing factors for producing a crumb rubber modified asphalt at a conventional temperature resulting in proper and uniform interaction and a homogeneous product. The product has improved settling properties because of the proper bond formation between crumb rubber components and asphalt functional groups. This results in increased life for pavements formed with the improved product and a product with improved rheological properties for both low and high temperatures.

While in accordance with the provisions of the Patent Statute the preferred forms and modifications of the invention have been illustrated and described, it will be apparent to those of ordinary skill in the art that various changes and modifications may be made without deviating from the inventive concepts set forth above.

What is claimed is:

1. A method for producing crumb rubber modified asphalt, comprising the steps of
   (a) heating a quantity of crumb rubber to a first temperature;
   (b) mixing peroxide with the crumb rubber;
   (c) adding the crumb rubber to asphalt binder;
   (d) adding a compatibilizer to the asphalt; and
   (e) continuously stirring the asphalt while maintaining the asphalt at a second temperature greater than said first temperature, whereby the crumb rubber is evenly disbursed throughout the asphalt to improve the settling characteristics thereof.

2. A method as defined in claim 1, wherein said peroxide mixing step comprises continuously stirring the crumb rubber for a period of between 20 and 30 minutes.

3. A method as defined in claim 2, wherein said first temperature is in the range of 65°–85° C., whereby a carbonium ion is generated on the crumb rubber.

4. A method as defined in claim 3, wherein said asphalt is maintained at said second temperature for a period of between 25 and 35 minutes while the compatibilizer is being added thereto.

5. A method as defined in claim 4, and further comprising the steps of maintaining said asphalt at said second temperature for a period of between 1 and 2 hours following addition of said compatibilizer and subsequently allowing said asphalt to cool to ambient temperature.

6. A method as defined in claim 5, wherein said second temperature is in the range of 160°–170° C.

7. A method as defined in claim 1, wherein the peroxide has a concentration of 0.02–0.06 millimoles/gram weight of the asphalt binder.

8. A method as defined in claim 7, wherein the compatibilizer has a concentration of 0.015–0.045 millimoles/gram weight of the asphalt binder.

9. A method as defined in claim 1, wherein said compatibilizer comprises methacrylate with glycidyl containing monomer, ethylene based glycidyl containing monomer, or a terpolymer of ethylene, butyl acrylate and glycidal methacrylate.

10. An improved asphalt composition formed by a process comprising the steps of
    (a) heating a quantity of crumb rubber to a first temperature;
    (b) mixing peroxide with the crumb rubber;
    (c) adding the crumb rubber to asphalt including a binder;
    (d) adding a compatibilizer to the asphalt; and
    (e) continuously stirring the asphalt while maintaining the asphalt at a second temperature greater than said first temperature, whereby the crumb rubber is evenly disbursed throughout the asphalt to improve the settling characteristics thereof.

11. An asphalt composition, comprising a mixture of asphalt, crumb rubber modified by hydrogen peroxide, and a compatibilizer.

12. An asphalt composition as defined in claim 11, wherein the weight by volume percentages for the components are 84.28–93.42% asphalt, 12.64–4.68% crumb rubber, 2.45–1.36% hydrogen peroxide, and 0.63–0.53% compatibilizer.

13. An asphalt composition as defined in claim 12, wherein said compatibilizer comprises methacrylate with glycidyl containing monomer, ethylene based glycidyl containing monomer, or a terpolymer of ethylene, butyl acrylate and glycidal methacrylate.

* * * * *